(12) United States Patent
Finnie

(10) Patent No.: US 7,691,938 B2
(45) Date of Patent: Apr. 6, 2010

(54) SILYL ESTER COPOLYMER COMPOSITIONS

(75) Inventor: Alistair Andrew Finnie, Whitley Bay (GB)

(73) Assignee: Akzo Nobel Coatings International B.V., Arnhem (NL)

(*) Notice: Subject to any disclaimer, the term of this patent is extended or adjusted under 35 U.S.C. 154(b) by 1102 days.

(21) Appl. No.: 10/563,129

(22) PCT Filed: Jun. 29, 2004

(86) PCT No.: PCT/EP2004/007301

§ 371 (c)(1), (2), (4) Date: Jan. 31, 2006

(87) PCT Pub. No.: WO2005/005516

PCT Pub. Date: Jan. 20, 2005

(65) Prior Publication Data

US 2006/0148977 A1 Jul. 6, 2006

(30) Foreign Application Priority Data

Jul. 7, 2003 (EP) ................... 03254297

(51) Int. Cl.
*C09D 5/02* (2006.01)
(52) U.S. Cl. .................... 524/556; 424/78.09
(58) Field of Classification Search .......... 524/556; 424/78.09
See application file for complete search history.

(56) References Cited

U.S. PATENT DOCUMENTS

| | | | |
|---|---|---|---|
| 4,593,055 A | 6/1986 | Gitlitz et al. | |
| 4,777,230 A | 10/1988 | Kamath | |
| 4,808,656 A | 2/1989 | Kania et al. | |
| 5,436,284 A | 7/1995 | Honda et al. | |
| 6,110,999 A | 8/2000 | Ourth et al. | |
| 6,172,132 B1 | 1/2001 | Nakamura et al. | |

FOREIGN PATENT DOCUMENTS

| | | |
|---|---|---|
| EP | 0 204 456 A1 | 12/1986 |
| EP | 0 297 505 B1 | 1/1989 |
| EP | 0 342 276 B1 | 11/1989 |
| EP | 0 529 693 B1 | 3/1993 |
| EP | 0 646 630 | 4/1995 |
| EP | 0 714 957 | 6/1996 |
| EP | 0 775 733 A1 | 5/1997 |
| EP | 0 779 304 B1 | 6/1997 |
| EP | 0 802 243 A | 10/1997 |
| EP | 1 016 681 | 7/2000 |
| EP | 1 127 902 A | 8/2001 |
| EP | 1 127 925 A | 8/2001 |
| EP | 1 201 700 | 5/2002 |
| EP | 1 273 589 B1 | 1/2003 |
| EP | 1 308 484 A | 5/2003 |
| EP | 1 308 484 A1 * | 5/2003 |
| EP | 1 342 756 | 9/2003 |
| GB | 1 457 590 | 12/1976 |
| GB | 2 311 070 A | 9/1997 |
| WO | WO 97/44401 | 11/1997 |
| WO | WO 99/37723 | 7/1999 |
| WO | WO 00/43460 | 7/2000 |
| WO | WO 00/77102 A1 | 12/2000 |
| WO | WO 02/02698 A1 | 1/2002 |
| WO | WO 2004/018533 A1 | 3/2004 |

OTHER PUBLICATIONS

Flory, P. J., "Polymerization of Unsaturated Monomers by Free Radical Mechanisms," *Principles of Polymer Chemistry*, Chapter 4, pp. 132-133 and 310, 1953.
Billmeyer Jr., F. W., *Textbook of Polymer Science Third Edition*, pp. 72 and 212, 1984.
Odian, G., "Radical Chain Polymerization," *Principles of Polymerization Third Edition*, pp. 214, 1991.
Callais, P. A. et al., Organic Peroxide Initiators for High-Solids Acrylic Resins, *European Coatings Journal*, No. 9, pp. 576-589, 1993.
California Air Resources Board (ARB) Suggested Control Measure for Architectural Coatings, published Jun. 22, 2000.
ITW Ransburg Technical Manual IL-307, published Dec. 2006.

* cited by examiner

*Primary Examiner*—Robert D. Harlan
(74) *Attorney, Agent, or Firm*—Kenyon & Kenyon LLP

(57) ABSTRACT

The invention relates to a silyl ester copolymer solution having a solids content of at least 55 weight percent and a viscosity of less than 20 poise at 25° C., comprising a silyl ester copolymer having a weight-average molecular weight of less than 20,000. The invention further relates to coating compositions comprising a silyl ester copolymer and to substrates and structures having a cured coating prepared from such a coating composition.

12 Claims, No Drawings

SILYL ESTER COPOLYMER COMPOSITIONS

The present invention relates to silyl ester copolymer solutions and antifouling coating compositions comprising a silyl ester copolymer and an ingredient having biocidal properties for aquatic organisms.

Man-made structures such as boat hulls, buoys, drilling platforms, oil production rigs, and pipes which are immersed in water are prone to fouling by aquatic organisms such as green and brown algae, barnacles, mussels, and the like. Such structures are commonly of metal, but may also comprise other structural materials such as concrete or wood. This fouling is a nuisance on boat hulls, because it increases frictional resistance during movement through the water, the consequence being reduced speeds and increased fuel costs. It is a nuisance on static structures such as the legs of drilling platforms and oil production rigs, firstly because the resistance of thick layers of fouling to waves and currents can cause unpredictable and potentially dangerous stresses in the structure, and, secondly, because fouling makes it difficult to inspect the structure for defects such as stress cracking and corrosion. It is a nuisance in pipes such as cooling water intakes and outlets, because the effective cross-sectional area is reduced by fouling, with the consequence that flow rates are reduced.

It is known to use antifouling paint, for instance as a top coat on ships' hulls, to inhibit the settlement and growth of marine organisms such as barnacles and algae, generally by release of a biocide for the marine organisms.

Traditionally, antifouling paints have comprised a relatively inert binder with a biocidal pigment that is leached from the paint. Among the binders which have been used are vinyl resins and rosin. Vinyl resins are seawater-insoluble and paints based on them use a high pigment concentration so as to have contact between the pigment particles to ensure leaching. Rosin is a hard brittle resin that is very slightly soluble in seawater. Rosin-based antifouling paints have been referred to as soluble matrix or eroding paints. The biocidal pigment is very gradually leached out of the matrix of rosin binder in use, leaving a skeletal matrix of rosin, which is washed off the hull surface to allow leaching of the biocidal pigment from deep within the paint film.

Many successful antifouling paints in recent years have been "self-polishing copolymer" paints based on a polymeric binder to which biocidal tri-organotin moieties are chemically bound and from which the biocidal moieties are gradually hydrolysed by seawater. In such binder systems, the side groups of a linear polymer unit are split off in a first step by reaction with seawater, the polymer framework that remains becoming water-soluble or water-dispersible as a result. In a second step, the water-soluble or water-dispersible framework at the surface of the paint layer on the ship is washed out or eroded. Such paint systems are described for example in GB-A-1 457 590.

Alternative self-polishing antifouling paint systems have been developed based on silyl ester copolymers. Silyl ester copolymers and antifouling compositions comprising these copolymers are, for example, described in WO 00/77102 A1, U.S. Pat. Nos. 4,593,055, and 5,436,284. Normally, a silyl ester copolymer solution is prepared which is subsequently used as one of the ingredients of the coating composition.

EP 1 127 902 discloses binders for anti-fouling compositions. The binders comprise silyl ester copolymers that can be prepared by addition polymerisation in an organic solvent. The molecular weight of the prepared copolymers is high, i.e. between 36,600 and 59,000.

EP 1 127 925 discloses binders for anti-fouling compositions comprising two types of polymers. One type may be a silyl ester copolymer. The silyl ester copolymer prepared in the Examples has a molecular weight of 37,600.

EP 0 775 733 A1 describes antifouling coating compositions comprising a chlorinated paraffin and a silyl ester copolymer having a weight-average molecular weight within the range of 1,000 to 150,000. The viscosity of the silyl ester copolymer in solution can be between 30 and 1,000 centipoise at 25° C. in a 50 weight percent xylene solution. In the examples, silyl ester copolymer solutions have been prepared with a solids content below 50 weight percent. The coating compositions prepared from these solutions comprise a high amount of volatile content. Coating compositions comprising a lower volatile content are not disclosed or suggested.

EP 0 802 243 A2 describes antifouling coating compositions comprising a silyl ester copolymer having a weight-average molecular weight within the range of 1,000 to 150,000. It is mentioned that the solids content of a solution of the silyl ester copolymer may be between 5 and 90 weight percent. In the examples, however, the prepared copolymer solutions comprise 50 weight percent volatile solvent content and the coating compositions prepared from these solutions comprise a high amount of volatile content. It is not disclosed in this document how a high solids copolymer solution can be obtained. There is also no indication of any possible or preferred ranges for the molecular weight of the copolymer in such a high solids solution. Further, it is not disclosed what specific properties such a high solids copolymer solution should have in case it is used to prepare an antifouling coating composition.

A drawback of coating compositions comprising a high amount of volatile organic compounds is that a large amount of these substances have to be evaporated, while the volatile organic content (VOC) level is restricted by present day legislation in many countries. For example, in the United States of America federal regulations limit the content of volatile organic hazardous air pollutants (generally synonymous with VOC) to less than 400 grams per liter for antifouling coatings. There is, accordingly, a need for antifouling coatings that comprise a lower level of volatile organic compounds, preferably having a VOC of less than 400 grams per liter.

The most common means of application of an antifouling coating are airless spray, brush or roller. We have found that to prepare a self-polishing antifouling coating composition comprising a silyl ester copolymer and having a VOC of less than 400 grams per liter that can be applied by airless spray, brush, roller or other common application methods, it is necessary to use a silyl ester copolymer solution having a solids content of at least 55 weight percent and a viscosity of 20 poise or less, preferably 10 poise or less at 25° C., otherwise the viscosity of the coating is too high to enable satisfactory application properties or additional solvent must be added at the point of application such that VOC limits may be exceeded.

The VOC level of a composition can be measured according to EPA reference method 24 in conjunction with ASTM standard D 3960-02 or calculated in accordance with ASTM standard D 5201-01. Both methods normally lead to similar results. When a value is given for the viscosity of a copolymer solution or coating composition according to the present invention, reference is made to the high shear viscosity measured using a cone and plate viscometer in accordance with ASTM standard D 4287-00.

Besides the above-mentioned demands on the coating composition, the resulting antifouling coatings on ships should have a high integrity, i.e. show almost no cracking and a good adhesion, particularly when applied to those parts of a vessel where the coating is alternately wet and dry, for instance at the waterline. The coating should be sufficiently hard, i.e. not soft or sticky, but it should not be brittle. Further, the coating should show hardly any so-called cold flow or plastic deformation, in other words, the film should not ripple when the ship moves in the water. Additionally, the coating composition needs to show a sufficiently short drying time.

The present invention specifically relates to silyl ester copolymer solutions, coating compositions comprising a silyl ester copolymer, and substrates and structures having a cured coating prepared from such a coating composition. It was found that adjusting the weight-average molecular weight, the polydispersity, the glass transition temperature, and the amount of side chains of the silyl ester copolymer can influence the copolymer solution properties, the coating composition properties, and the coating properties.

For the current invention, the weight-average molecular weights are given in terms of weight-average molecular weight as measured by GPC (gel permeation chromatography) and calculated relative to polystyrene standards. Polydispersity (D), sometimes also referred to as molecular weight distribution, is defined as the ratio of the weight-average molecular weight (Mw) to the number-average molecular weight (Mn) of the polymer (D=Mw/Mn). The polydispersity can be determined by GPC with tetra-hydrofuran (THF) as solvent and polystyrene as reference.

The present invention relates to a silyl ester copolymer solution having a solids content of at least 55 weight percent, preferably at least 60, even more preferably at least 65 weight percent, and a viscosity of less than 20 poise, preferably less than 10 poise, even more preferably less than 5 poise at 25° C. Preferably, the solids content of the solution is not more than 80 weight percent. The solids content of a composition can be measured using ASTM standard 1644 or calculated in accordance with ASTM standard D 5201-01.

The silyl ester copolymer in solution preferably has a weight-average molecular weight of more than 1,500, even more preferably of more than 2,000, the weight-average molecular weight preferably being less than 20,000, even more preferably less than 15,000.

The copolymer preferably has a polydispersity of more than 1.1; the polydispersity preferably is less than 3.0, even more preferably less than 2.8. The silyl ester copolymer in solution preferably has a glass transition temperature above 5° C., even more preferably above 10° C.; preferably, the glass transition temperature is below 90° C., even more preferably below 60° C.

Preferably, more than 10 weight percent, even more preferably more than 30 weight percent, and highly preferably more than 40 weight percent of said copolymer consists of building blocks having side chains with a silyl ester functionality. Preferably, less than 70 weight percent, even more preferably less than 60 weight percent of said copolymer consists of building blocks having side chains with a silyl ester functionality.

The present invention further relates to a stable antifouling coating composition having a VOC below 400 grams per liter and a viscosity of less than 20 poise, preferably less than 10 poise, even more preferably less than 5 poise at 25° C. Preferably, the antifouling composition comprises:

a silyl ester copolymer preferably having a weight-average molecular weight of more than 1,500, even more preferably of more than 2,000, the weight-average molecular weight preferably being less than 20,000, even more preferably less than 15,000, a polydispersity preferably of more than 1.1, preferably of less than 3.0, even more preferably of less than 2.8; a glass transition temperature preferably above 5° C., even more preferably above 10° C., the glass transition temperature preferably being below 90° C., even more preferably below 60° C., with preferably more than 10, even more preferably more than 30, highly preferably more than 40, and preferably less than 70, even more preferably less than 60 weight percent of said silyl ester copolymer consisting of side chains having a silyl ester functionality, and an ingredient having biocidal properties for aquatic organisms.

Films prepared from the coating composition according to the present invention show a good integrity and a low cold flow.

During the preparation of the coating composition, the silyl ester copolymer solution is preferably added in an amount of between 1 and 60 weight percent, more preferably between 5 and 50 weight percent, even more preferably between 15 and 45 weight percent, based upon the total weight of the coating composition.

In the coating composition, the ingredient having biocidal properties for aquatic organisms preferably is present in an amount of between 0.1 and 70 weight percent, more preferably between 1 and 60 weight percent, even more preferably between 2 and 55 weight percent, based upon the total weight of the coating composition.

The silyl ester copolymer present in the silyl ester copolymer solution and the coating composition according to the present invention is a copolymer comprising at least one side chain bearing at least one terminal group of the formula (I):

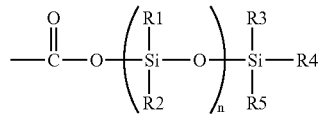

wherein n is 0 or an integer of 1 to 50, and R1, R2, R3, R4, and R5 are each independently selected from the group consisting of optionally substituted $C_{1-20}$-alkyl, optionally substituted $C_{1-20}$-alkoxy, optionally substituted aryl, and optionally substituted aryloxy. Preferably, at least one of the groups R1-R5 in the silyl ester copolymer is methyl, isopropyl, n-butyl, isobutyl, or phenyl. More preferably, n is 0 and R3, R4, and R5 are the same or different and represent isopropyl, n-butyl, or isobutyl.

In the present context, the term $C_{1-20}$-alkyl represents straight, branched, and cyclic hydrocarbon groups having from 1 to 20 carbon atoms, such as methyl, ethyl, propyl, isopropyl, n-butyl, iso-butyl, sec-butyl, tert-butyl, pentyl, hexyl, cyclohexyl, heptyl, octyl, nonyl, decyl, undecyl, dodecyl, tertadecyl, hexadecyl, octadecyl, and icosyl. The term substituted $C_{1-20}$-alkoxy means $C_{1-20}$-alkyl oxy, such as methoxy, ethoxy, propoxy, isopropoxy, n-butoxy, iso-butoxy, sec-butoxy, tert-butoxy, pentoxy, hexoxy, cyclohexoxy, heptoxy, octoxy, nonoxy, decoxy, undecoxy, dodecoxy, tertadecoxy, hexadecoxy, octadecoxy, and ocosoxy. The term aryl is to be understood to mean an aromatic carbocyclic ring or ring system, such as phenyl, naphthyl, biphenyl, and xylyl. The term "optionally substituted" is used to indicate that the group in question may be substituted with substituents one or more times, preferably 1 to 5 times. These substituents may, for example, be hydroxy, alkyl, hydroxyalkyl, alkyl-carbonyloxy, carboxy, alkoxycarbonyl, alkoxy, alkenyloxy, oxo, alkylcarbonyl, aryl, amino, alkylamino, carbamoyl, alkylaminocarbonyl, aminoalkylamino-carbonyl, aminoalkylaminocarbonyl, alkylcarbonylamine, cyano, guanidino, carbamido, alkanoyloxy, sulphono, alkylsulphonyloxy, nitro, sulphanyl, alkylthio, and halogen.

A silyl ester copolymer comprising at least one side chain bearing at least one terminal group of the above-described formula (I) can, for example, be obtained by copolymerizing one or more vinyl polymerisable monomers with one or more monomers comprising one or more olefinic double bonds and one or more of the above-described terminal groups (I).

Examples of suitable vinyl polymerisable monomers which can be copolymerised with one or more monomers comprising one or more olefinic double bonds and one or more of the above-described terminal groups (I) include (meth)acrylate esters such as methyl methacrylate, ethyl methacrylate, butyl methacrylate, 2-ethylhexyl methacrylate, 2-hydroxyethyl methacrylate, and methoxyethyl methacrylate; maleic acid esters such as dimethyl maleate and diethyl maleate; fumaric acid esters such as dimethyl fumarate and diethyl fumarate; styrene, vinyl toluene, α-methyl-styrene, vinyl chloride, vinyl acetate, butadiene, acrylamide, acrylonitrile, methacrylic acid, acrylic acid, isobornyl methacrylate, maleic acid, and mixtures thereof. Preferably, a mixture of methyl (meth)acrylate or ethyl (meth)acrylate with another vinyl polymerisable monomer is used. It is possible to adjust the polishing rate of the coating by using a mixture of a hydrophobic and a hydrophilic (meth)acrylate. Optionally a hydrophylic comonomer is included such as methoxy ethyl (meth)acrylate or a higher polyethylene oxide derivative, such as ethoxy ethyl (meth)acrylate, propoxy ethyl (meth)acrylate, butoxy ethyl (meth)acrylate, a polyoxyethylene glycol monoalkyl ether (meth)acrylate, such as polyoxyethylene (n=8) glycol monomethyl ether methacrylate, or N-vinyl pyrrolidone.

Examples of suitable monomers comprising one or more olefinic double bonds and one or more of the above-described terminal groups (I) which can be copolymerised with one or more vinyl polymerisable monomers include monomers comprising one or more of the terminal groups (I) in which n=0, and which may be represented by the formula (II):

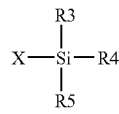

wherein R3, R4, and R5 are as defined above, and X is a (meth)acryloyloxy group, a maleinoyloxy group, or a fumaroyloxy group.

The preparation of the monomers (II) can, for example, be performed according to the methods described in EP 0 297 505 or according to the methods described in EP 1 273 589 and the references cited therein. Examples of suitable (meth)acrylic acid-derived monomers include: trimethylsilyl (meth)acrylate, triethylsilyl (meth)acrylate, tri-n-propylsilyl (meth)acrylate, triisopropylsilyl (meth)acrylate, tri-n-butylsilyl (meth)acrylate, triisobutylsilyl (meth)acrylate, tri-tert-butylsilyl (meth)acrylate, tri-n-amylsilyl (meth)acrylate, tri-n-hexylsilyl (meth)acrylate, tri-n-octylsilyl (meth)acrylate, tri-n-dodecylsilyl (meth)acrylate, triphenylsilyl (meth)acrylate, tri-p-methylphenylsilyl (meth)-acrylate, tribenzylsilyl (meth)acrylate, dimethylphenylsilyl (meth)acrylate, dimethylcyclohexyl (meth)acrylate, ethyldimethylsilyl (meth)acrylate, n-butyl-dimethylsilyl (meth)acrylate, t-butyidimethylsilyl (meth)acrylate, diisopropyl-n-butylsilyl (meth)acrylate, n-octyldi-n-butylsilyl (meth)acrylate, diisopropyl-stearylsilyl (meth)acrylate, dicyclohexylphenylsilyl (meth)acrylate, t-butyl-diphenylsilyl (meth)acrylate, and lauryidiphenylsilyl (meth)acrylate. Preferably, triisopropylsilyl (meth)acrylate, tri-n-butylsilyl (meth)acrylate, or triisobutylsilyl (meth)acrylate is used in the preparation of the silyl ester copolymer.

As stated above, it was found that by adjusting the properties of the silyl ester copolymer, the copolymer solution properties, the coating composition properties, and the coating properties can be influenced. Further, preferred ranges found for a number of the properties have been listed.

In general, the reaction temperature has an influence on the molecular weight of the copolymer. The molecular weight can additionally or alternatively also be adjusted by the amount of initiator used and/or by adding a change transfer agent, e.g. a thiol. The type of initiator influences the degree of polydispersity. For example, the polydispersity may be lowered by choosing an azo-initiator, e.g. azobis-isobutyronitrile or azobis-methylbutyronitrile. Alternatively or additionally, the solvent in which the reaction takes place can be adjusted to adjust the molecular weight of the copolymer and its polydispersity. The viscosity of the silyl ester copolymer solution and/or the coating composition can be adjusted by adjusting the molecular weight of the copolymer and/or by adjusting its polydispersity, and/or by adjusting the solids content.

The amount of unreacted, unconverted monomers should be as low as possible. This is because unreacted monomer may act as a solvent for the polymer and contribute to the VOC of the coating composition. The viscosity of the copolymer solution and the coating composition is preferably adjusted with solvent instead of monomers, as most solvents cost less than monomers. Additionally, exposure to monomers should be kept to a minimum because of the health and safety concerns associated with monomers. Further, free monomers in a coating composition may have a negative effect on the final film properties. The monomers may act as plasticisers and/or cause water to enter a film due to their hydrophilic nature. The degree of conversion of the reaction can be increased by the addition of a boost initiator, but this is not mandatory. In the process to prepare a copolymer solution according to the present invention, preferably a boost initiator is used, more preferably an azo-initiator, e.g. azobis-isobutyronitrile or azobis-methylbutyronitrile, is used as boost initiator.

The ingredient having biocidal properties for aquatic organisms which is present in the coating composition according to the present invention can be a pigment, or a mixture of pigments, having biocidal properties. Examples of suitable biocides are inorganic biocides, e.g. copper oxides, copper thiocyanate, copper bronze, copper carbonate, copper chloride, copper nickel alloys; organometal biocides, e.g. zinc pyrithione (the zinc salt of 2-pyridinethiol-1-oxide), copper pyrithione, bis (N-cyclohexyl-diazenium dioxy) copper, zinc ethylene-bis(dithiocarbamate) (i.e. zineb), and manganese ethylene-bis(dithiocarbamate) complexed with zinc salt (i.e. mancozeb); and organic biocides, e.g. formaldehyde, dodecylguanidine monohydrochloride, thiabendazole, N-trihalomethyl thiophthalimides, trihalomethyl thiosulphamides, N-aryl-maleimides, 2-methylthio-4-butylamino-6-cyclopopylamino-s-triazine, 3-benzo[b]thien-yl-5,6-dihydro-1,4,2-oxathiazine 4-oxide, 4,5-dichloro-2-(n-octyl)-3(2H)-isothiazolone, 2,4,5,6-tetrachloroisophthalonitrile, 3-iodo-2-propynylbutyl carbamate, pyridine triphenylborane, a 2-trihalogenomethyl-3-halogeno-4-cyano pyrrole derivative substituted in position 5 and optionally in position 1, such as 2-(p-chlorophenyl)-3-cyano-4-bromo-5-trifluoromethylpyrrole, and a furanone, such as 3-butyl-5-(dibromomethylidene)-2(5H)-furanone, and mixtures thereof.

In addition to the silyl ester copolymer and the ingredient having biocidal properties for aquatic organisms, the antifouling coating compositions according to the present invention optionally comprise another resin or a mixture of other resins and/or one or more non-biocidal pigments and/or additives such as one or more thickening or thixotropic agents, one or more wetting agents, fillers, a liquid carrier such as an organic solvent, organic non-solvent or water, etc.

Examples of resins that can be used in addition to the silyl ester copolymer in the antifouling coating composition according to the present invention include polymers which are free of triorganosilyl ester groups and triorganotin groups but are reactive in seawater, materials which are slightly soluble or water-sensitive in seawater, and materials which are insoluble in seawater.

As examples of suitable polymers which are free of triorganosilyl ester groups and triorganotin groups but are reactive in seawater, several resins may be mentioned. For instance, an example of a suitable polymer is an acid-functional film-forming polymer the acid groups of which are blocked by quaternary ammonium groups or quaternary phosphonium groups. This is for instance described in WO 02/02698. A seawater-reactive polymer can alternatively be a film-forming polymer comprising quaternary ammonium groups and/or quaternary phosphonium groups bound (pendant) to the backbone of the polymer. These quaternary ammonium groups and/or quaternary phosphonium groups are neutralised or, in other words, blocked or capped by counter-ions. Said counter-ions consist of the anionic residue of an acid having an aliphatic, aromatic, or alkaryl hydrocarbon group comprising at least 6 carbon atoms. Such systems are for instance described in EP 02255612.0.

A further example of a suitable seawater-reactive polymer is an acid-functional film-forming polymer the acid groups of which are blocked by groups capable of hydrolysing or dissociating to leave a polymer soluble in seawater, the blocking groups being selected from divalent metal atoms bonded to a monovalent organic residue, divalent metal atoms bonded to a hydroxyl residue, and monoamine groups which form an organic solvent-soluble amine salt of the polymer, as described in WO 00/43460. For instance, such a seawater-reactive, acid-functional film-forming polymer the acid groups of which are blocked may be a polymer having at least one side chain bearing at least one terminal group of the formula:

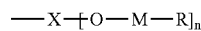

wherein X represents

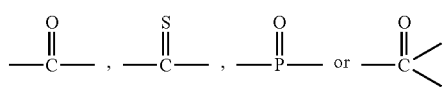

M is a metal selected from zinc, copper, and tellurium; x is an integer of 1 to 2;

R represents an organic residue selected from

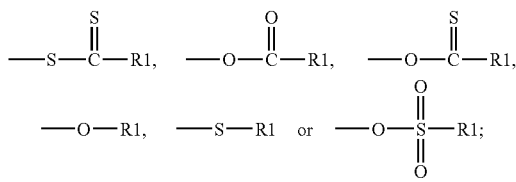

and
R1 is a monovalent organic residue, as described in EP-A-204 456.

Such a hydrolysable polymer preferably is an acrylic polymer wherein X represents

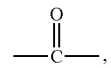

M is copper, and R represents

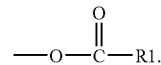

The parent acrylic polymer having a —COOH group instead of —X—[O-M-R]$_n$ preferably has an acid value of 25-350 mg KOH/g. Most preferably, the hydrolysable polymer has a copper content of 0.3-20 weight percent and R1 is the residue of a high boiling organic monobasic acid. Such hydrolysable polymers can be prepared by the processes disclosed in EP 0 204 456 and EP 0 342 276. The copper-containing film-forming polymer preferably is a copolymer comprising an acrylic or methacrylic ester the alcohol residue of which includes a bulky hydrocarbon radical or a soft segment, for example a branched alkyl ester having 4 or more carbon atoms or a cycloalkyl ester having 6 or more atoms, a polyalkylene glycol monoacrylate or monomethacrylate optionally having a terminal alkyl ether group or an adduct of 2-hydroxyethyl acrylate or methacrylate with caprolactone, as described in EP 0 779 304.

Alternatively, such a seawater-reactive, acid-functional film-forming polymer the acid groups of which are blocked may be a carboxylic acid-functional polymer. For example, it may be a copolymer of acrylic or methacrylic acid with one or more alkyl acrylates or methacrylates, at least some of the acid groups of which have been converted to groups of the formula —COO-M-OH, wherein M is a divalent metal such as copper, zinc, calcium, magnesium or iron, as described in GB 2,311,070.

Another example of such a seawater-reactive, acid-functional film-forming polymer the acid groups of which are blocked is a polymer that is a salt of an amine. Preferably, it is a salt of an amine containing at least one aliphatic hydrocarbon group having 8 to 25 carbon atoms and an acid-functional film-forming polymer as described in EP 0 529 693, the acid-functional polymer preferably being an addition copolymer of an olefinically unsaturated carboxylic acid, sulphonic acid, acid sulphate ester, phosphonic acid or acid phosphate ester and at least one olefinically unsaturated co-monomer, the unsaturated carboxylic acid for example being acrylic or methacrylic acid, the unsaturated sulphonic acid for example being 2-acrylamido-2-methylpropane sulphonic acid (AMPS), and the film-forming polymer preferably being an amine sulphonate copolymer containing units of an organocyclic ester as described in WO 99/37723.

As examples of suitable polymers or resins that are slightly soluble or water-sensitive in seawater the following compounds may be mentioned: polyvinyl methyl ether, polyvinyl ethyl ether, alkyd resins, modified alkyd resins, polyurethanes, saturated polyester resins, poly-N-vinyl pyrollidones, and rosin material. Such a rosin material preferably is rosin, particularly wood rosin or alternatively tall rosin or gum rosin. The main chemical constituent of rosin is abietic acid. The rosin can be any of the grades sold commercially, preferably that sold as WW (water white) rosin. The rosin material can alternatively be a rosin derivative, for example a maleinised or fumarised rosin, hydrogenated rosin, formylated rosin or polymerised rosin, or a rosin metal salt such as calcium, magnesium, copper or zinc rosinate.

As examples of suitable polymers or resins that are insoluble in seawater the following compounds may be mentioned: modified alkyd resins, epoxy polymers, epoxy esters, epoxy urethanes, polyurethanes, linseed oil, castor oil, soybean oil and derivatives of such oils. Other examples of suitable seawater-insoluble polymers or resins are: vinyl ether polymer, for example a poly(vinyl alkyl ether), such as polyvinyl isobutyl ether, or a copolymer of a vinyl alkyl ether with vinyl acetate or vinyl chloride, an acrylate ester polymer such as a homopolymer or copolymer of one or more alkyl acrylates or methacrylates which preferably contain 1 to 6 carbon atoms in the alkyl group and may contain a co-monomer such as acrylonitrile or styrene, and a vinyl acetate polymer such as polyvinyl acetate or a vinyl acetate vinyl chloride copolymer. Alternatively, the seawater-insoluble polymers or resins can be a polyamine, particularly a polyamide having a plasticising effect such as a polyamide of a fatty acid dimer or the polyamide sold under the Trademark "Santiciser".

If in addition to the silyl ester copolymer and the ingredient having biocidal properties for aquatic organisms the coating composition comprises another resin or a mixture of other resins, this/these other resin(s) can form up to 99 weight percent of the total amount of resins in the coating composition. Preferably, the other resin is rosin material and forms up to 20 percent of the total resins in the coating composition to obtain a self-polishing coating of high quality. Alternatively, preferably the other resin is a rosin material and forms 50 to 80 percent of the total resins in the coating composition to obtain a so-called controlled depletion coating or a hybrid coating.

In another embodiment, the other resin is a mixture of a rosin material and a seawater-insoluble resin. In that case the rosin material forms 20 up to 80 or 95 weight percent of the total amount of resins in the coating composition. The rosin material preferably forms at least 25, more preferably at least 50, most preferably at least 55 weight percent of the total amount of resins in the coating composition. The silyl ester preferably forms at least 30, most preferably at least 50, up to 80 or 90 weight percent of the total weight of non-rosin resins, the seawater-insoluble resin being the remainder.

Example of non-biocidal pigments that can be added to a composition comprising the silyl ester copolymer and the ingredient having biocidal properties for aquatic organisms are slightly seawater-soluble non-biocides such as zinc oxide and barium sulphate and seawater-insoluble non-biocides such as fillers and colouring pigments, e.g., titanium dioxide, ferric oxide, phthalocyanine compounds, and azo pigments.

Examples of additives that can be added to a composition comprising the silyl ester copolymer and the ingredient having biocidal properties for aquatic organisms are reinforcing agents, stabilisers, thixotropes or thickening agents, plasticisers, and liquid carriers.

Examples of suitable reinforcing agents are fibres, e.g., carbide fibres, silicon-containing fibres, metal fibres, carbon fibres, sulphide fibres, phosphate fibres, polyamide fibres, aromatic polyhydrazide fibres, aromatic polyester fibres, cellulose fibres, rubber fibres, acrylic fibres, polyvinylchloride fibres, and polyethylene fibres. Preferably, the fibres have an average length of 25 to 2,000 microns and an average thickness of 1 to 50 microns with a ratio between the average length and the average thickness of at least 5. Examples of suitable stabiliser agents are moisture scavengers, zeolites, aliphatic or aromatic amines such as dehydroabietylamine, tetraethylorthosilicate, and triethyl orthoformate. Examples of suitable thixotropes or thickening agents are silicas, bentones, and polyamide waxes.

Examples of suitable plasticisers are phthalate esters such as dibutyl phthalate, butyl benzyl phthalate or dioctyl phthalate, phosphate triesters such as tricresyl or tris(isopropyl) phenyl phosphate, or chlorinated paraffins, and sulphonamides such as N-substituted toluene sulphonamide. Examples of suitable liquid carriers are organic solvents, organic non-solvents, and water. Suitable examples of organic solvents are an aromatic hydrocarbon such as xylene, toluene or trimethyl benzene, an alcohol such as n-butanol, an ether alcohol such as butoxyethanol or methoxypropanol, an ester such as butyl acetate or isoamyl acetate, an ether-eater such as ethoxyethyl acetate or methoxypropyl acetate, a ketone such as methyl isobutyl ketone or methyl isoamyl ketone, an aliphatic hydrocarbon such as white spirit, or a mixture of two or more of these solvents. It is possible to disperse the coating in an organic non-solvent for the film forming components in the coating composition. Alternatively, the coating can be water-based; for example, it can be based on an aqueous dispersion.

The invention will be elucidated with reference to the following examples. These are intended to illustrate the invention but are not to be construed as limiting in any manner the scope thereof.

EXAMPLES

Copolymer solutions and coating compositions according to the present invention were prepared and comparative examples performed.

The following abbreviations are used:

| | |
|---|---|
| TBSMA | tributylsilyl methacrylate |
| TiPSA | triisopropylsilyl acrylate |
| MMA | methyl methacrylate |
| NVP | N-vinyl pyrrolidone |
| MEA | methoxyethyl acrylate |
| TBPEH | tertiary-butylperoxy ethylhexanoate |
| AIBN | azobis-isobutyronitrile |
| AMBN | azobis-methylbutyronitrile |

The high shear viscosity is expressed in poise. The solids content is expressed in weight percentage. The number-average molecular weight (Mn) and the weight-average molecular weight (Mw) are given relative to polystyrene.

The theoretical solids content (in weight percent or in percent non-volatile by volume) was calculated from the formulation for each composition in accordance with ASTM standard D 5201-01. The actual solids content (in weight percent) was determined in accordance with ASTM standard 1644.

The theoretical VOC level (in grams per liter) was calculated from the formulation for each composition in accordance with ASTM standard D 5201-01. The determined VOC level (in grams per liter) was measured in accordance with EPA Reference Method 24 in conjunction with ASTM standard D3960-02.

Copolymer Solutions

Comparative Examples 1a and 1b

Example 10 of EP 1 127 902 was repeated to prepare Comparative Copolymer Solution 1a (CSol 1a) and for another sample the Example was partially followed, resulting in Comparative Copolymer Solution 1b. The ingredients of the compositions are presented in Table 1.

TABLE 1

Ingredients for Comparative Copolymer Solutions 1a and 1b

|  | Component | CSol 1a and CSol 1b Monomer comp. (wt %) | CSol 1a Parts by weight | CSol 1b Parts by weight |
| --- | --- | --- | --- | --- |
| Monomers | TBSMA | 45 | 23.32 | 23.32 |
|  | MMA | 50 | 25.91 | 25.91 |
|  | NVP | 5 | 2.59 | 2.59 |
| Main Initiator | TBPEH |  | 1.04 | 1.04 |
| Boost initiator | TBPEH |  | 5 times 0.10 | 5 times 0.10 |
| Solvent (xylene) | Reactor charge |  | 27.89 | 27.89 |
|  | Pre-mix charge |  | 4.24 | 4.24 |
|  | Boost solvent |  | — | — |
|  | Thinning solvent |  | 14.50 | — |

Following the procedure of Example 10 of EP 1 127 902, a pre-mix of the monomers, initiator, and solvent (xylene) was prepared in the prescribed proportions and a further quantity of solvent (xylene) was charged to a temperature-controlled reaction vessel equipped with a stirrer, a reflux condenser, a nitrogen inlet, and a pre-mix feed inlet. The reaction vessel was heated and maintained at 90° C. and the pre-mix was charged to the reaction vessel at a constant rate over 3 hours under an atmosphere of nitrogen. After a further 30 minutes, five post-additions of TBPEH as boost initiator were added at 45-minute intervals. After a further 15 minutes, the temperature of the reaction vessel was increased to 120° C. during 1 hour and then cooled.

A sample of the product was proportionally thinned with xylene as described in Example 10 of EP 1 127 902 to give Comparative Copolymer Solution 1a (CSol 1a). A further sample was not thinned down; this resulted in Comparative Copolymer Solution 1b (CSol 1b). The properties of the resulting copolymer solutions are presented in Table 2.

TABLE 2

Properties of Comparative Copolymer Solutions 1a and 1b

|  | CSol 1a | CSol 1b |
| --- | --- | --- |
| Nominal solids (theoretical value in wt %) | 53.4 | 62.4 |
| Actual solids (determined value in wt %) | 52.3 | 61.6 |

TABLE 2-continued

Properties of Comparative Copolymer Solutions 1a and 1b

|  | CSol 1a | CSol 1b |
| --- | --- | --- |
| Viscosity (poise) | 14.4 | >40 |
| Number-average molecular weight (g/mol) | 13,145 | 13,145 |
| Weight-average molecular weight (g/mol) | 38,560 | 38,560 |
| Polydispersity (Mw/Mn) | 2.93 | 2.93 |
| Glass transition temperature (° C.) | 43 | 43 |

This Example shows that just lowering the amount of solvents to obtain a high solids solution may have a very large effect on the viscosity of the copolymer solution.

Example 2

Using the same types and amounts of monomers as used in Comparative Examples 1a and 1b, Copolymer Solution 2 (Sol 2) was prepared. Copolymer Solution 2 is a solution according to the present invention. The ingredients of the composition are presented in Table 3.

TABLE 3

Ingredients for Copolymer Solution 2

|  | Component | Monomer comp. (wt %) | Parts by weight |
| --- | --- | --- | --- |
| Monomers | TBSMA | 45 | 26.14 |
|  | MMA | 50 | 29.04 |
|  | NVP | 5 | 2.90 |
| Main Initiator | AIBN |  | 1.34 |
| Boost initiator | AIBN |  | 2 times 0.29 |
| Solvent (xylene) | Reactor charge |  | 26.00 |
|  | Pre-mix charge |  | 12.00 |
|  | Boost solvent |  | 2 times 1.00 |
|  | Thinning solvent |  | — |

A pre-mix of the monomers, initiator, and solvent (xylene) was prepared in the prescribed proportions and a further quantity of solvent (xylene) was charged to a temperature-controlled reaction vessel equipped with a stirrer, a reflux condenser, a nitrogen inlet, and a pre-mix feed inlet. The reaction vessel was heated and maintained at 100° C. and the pre-mix was charged to the reaction vessel at a constant rate over 3 hours under an atmosphere of nitrogen. After a further 30 minutes, two post-additions of AIBN as boost initiator were added as a xylene slurry at 45-minute intervals. The reaction vessel was maintained at 100° C. for a further 1 hour and then cooled. The properties of the resulting copolymer solution are presented in Table 4.

TABLE 4

Properties of Copolymer Solution 2

|  | Sol 2 |
| --- | --- |
| Nominal solids (theoretical value in wt %) | 60 |
| Actual solids (determined value in wt %) | 60.5 |

TABLE 4-continued

Properties of Copolymer Solution 2

|  | Sol 2 |
| --- | --- |
| Viscosity (poise) | 11.4 |
| Number-average molecular weight (g/mol) | 5810 |
| Weight-average molecular weight (g/mol) | 12345 |
| Polydispersity (Mw/Mn) | 2.12 |
| Glass transition temperature (° C.) | 43 |

Compared to Example 1b, the Copolymer Solution 2 has a higher solids content, a lower viscosity, a lower weight-average molecular weight, and a lower polydispersity. Further, more monomers were converted, as is clear from the small difference between the theoretical and the determined solids content.

Examples 3a to 3d

Using a new set of monomers, four copolymer solutions according to the present invention were prepared. The ingredients of the composition are presented in Tables 5a and 5b.

TABLE 5a

Monomer compositions of Copolymer Solutions 3a to 3d

| Component | | Sol 3a Monomer comp. (wt %) | Sol 3b Monomer comp. (wt %) | Sol 3c Monomer comp. (wt %) | Sol 3d Monomer comp. (wt %) |
| --- | --- | --- | --- | --- | --- |
| Monomers | TiPSA | 60 | 60 | 60 | 60 |
|  | MMA | 33 | 33 | 33 | 40 |
|  | MEA | 7 | 7 | 7 | — |

TABLE 5b

Ingredients for Copolymer Solutions 3a to 3d

| Component | | Sol 3a Parts by weight | Sol 3b Parts by weight | Sol 3c Parts by weight | Sol 3d Parts by weight |
| --- | --- | --- | --- | --- | --- |
| Monomers | TiPSA | 34.7 | 34.35 | 37.21 | 34.75 |
|  | MMA | 19.11 | 18.89 | 20.47 | 23.17 |
|  | MEA | 4.05 | 4.01 | 4.34 | — |
| Main Initiator | AMBN | 1.51 | 2.18 | 2.36 | 1.51 |
| Boost initiator | AIBN | 2 times 0.29 | 2 times 0.29 | 2 times 0.31 | 2 times 0.29 |
| Solvent (xylene) | Reactor charge | 26.00 | 26.00 | 24.50 | 26.00 |
|  | Pre-mix charge | 12.00 | 12.00 | 8.75 | 12.00 |
|  | Boost solvent | 2 times 1.00 | 2 times 1.00 | 0.88 | 2 times 1.00 |

The general procedure described for the preparation of Example 2 was followed to give Copolymer Solutions 3a to 3d. The properties of the resulting copolymer solutions are presented in Table 6.

TABLE 6

Properties of Copolymer Solutions 3a to 3d

|  | Sol 3a | Sol 3b | Sol 3c | Sol 3d |
| --- | --- | --- | --- | --- |
| Nominal solids (theoretical value in wt %) | 60 | 60 | 65 | 60 |
| Actual solids (determined value in wt %) | 59.2 | 59.3 | 64.6 | 59.5 |
| Viscosity (poise) | 1.41 | 1.29 | 3.13 | 2.44 |
| Number-average molecular weight (g/mol) | 3,635 | 3,095 | 3,315 | 3,865 |
| Weight-average molecular weight (g/mol) | 8,775 | 6,705 | 7,465 | 3,520 |
| Polydispersity (Mw/Mn) | 2.42 | 2.2 | 2.23 | 2.5 |
| Glass transition temperature (° C.) | 42 | 42 | 42 | 55 |

Comparative Examples 4a and 4b

The preparation of polymer PA4 as described in EP1 127 925 was repeated, following the preparation description for Examples S-1 to S-6 in EP0 775 733, to prepare Comparative Copolymer Solution 4a. Another experiment was performed using less solvent, which resulted in CSol 4b. The ingredients of the compositions are presented in Table 7.

TABLE 7

Ingredients for Comparative Copolymer Solutions 4a and 4b

|  | Component | CSol 4a and CSol 4b Monomer comp. (wt %) | CSol 4a Parts by weight | CSol 4b Parts by weight |
| --- | --- | --- | --- | --- |
| Monomers | TBSMA | 57 | 28.50 | 33.79 |
|  | MMA | 43 | 21.50 | 25.49 |
| Main Initiator | AIBN |  | 0.60 | 0.71 |
| Boost initiator | (none) |  | — | — |
| Solvent (xylene) | Reactor charge |  | 49.40 | 40.00 |
|  | Pre-mix charge |  | — | — |
|  | Boost solvent |  | — | — |
|  | Thinning solvent |  | — | — |

Following the description of the preparation of polymer PA4 in EP 1 127 925, i.e. as described in EP 0 775 733, a pre-mix of the monomers and initiator was prepared in the prescribed proportions and a further quantity of solvent (xylene) was charged to a temperature-controlled reaction vessel equipped with a stirrer, a reflux condenser, a nitrogen inlet, and a pre-mix feed inlet. The reaction vessel was heated and maintained at 90° C. and the pre-mix was charged to the reaction vessel at a constant rate over 4 hours under an atmosphere of nitrogen. The temperature of the reaction vessel was maintained at 90° C. for a further 4 hours and then cooled. In accordance with the description of the preparation of polymer PA4 in EP 1 127 925, i.e. as described in EP 0 775 733, no boost initiator was added.

Comparative Copolymer Solution 4a (CSol 4a) was prepared using a larger amount of solvent than used in the preparation of CSol 4b. The properties of the resulting copolymer solutions are presented in Table 8.

TABLE 8

Properties of Comparative Copolymer Solutions 4a and 4b

|  | CSol 4a | CSol 4b |
|---|---|---|
| Nominal solids (theoretical value in wt %) | 50 | 60 |
| Actual solids (determined value in wt %) | 46.1 | 55.8 |
| Viscosity (poise) | 0.93 | 4.95 |
| Number-average molecular weight (g/mol) | 9,630 | 10,030 |
| Weight-average molecular weight (g/mol) | 20,020 | 22,345 |
| Polydispersity (Mw/Mn) | 2.08 | 2.22 |
| Glass transition temperature (° C.) | 33 | 33 |

The conversion rate of both samples is low, which may be due to the fact that no boost initiator was used in the preparation.

Coating Compositions

Using some of the above-described copolymer solutions, coating compositions were prepared. These coating compositions were used to prepare coated substrates which were tested for their properties.

Hardness Test

Test coating films were prepared by casting the coating compositions onto degreased glass panels (approximately 15 cm×10 cm) using a bar applicator having a 500-micron gap width. The coating films were dried under ambient conditions for 3 days before testing. The hardness of the coating was subsequently determined by the König pendulum damping method described in ISO 1522. Hardness was quantified as the number of pendulum swings to damp from 6° to 3°.

Mechanical Performance (Crack Resistance) Test

Test specimens were prepared by casting the paints with a bar applicator (500-micron gap width) onto steel or aluminium panels (15.2 cm×10.2 cm) which had previously been coated with a commercial anticorrosive coating (Intertuf 203, International Coatings Ltd.). The panels were dried for at least 3 days under ambient conditions. The panels were subsequently immersed in natural seawater at 23° C. for 24 hours. The panels were then removed from the seawater and allowed to dry for 8 hours. Thereafter, the panels were re-immersed in natural seawater at 23° C. for 16 hours and removed and dried for 8 hours. This cycle was repeated four times. After the wet-dry cycling, the mechanical performance, in particular the crack resistance, of the coatings was assessed according to the following panel rating scheme.

Panel Rating:

| | |
|---|---|
| 5: | no cracking or other visible defects |
| 4: | hairline cracks, just visible to the naked eye |
| 3: | mild cracking |
| 2: | moderate cracking |
| 1: | severe cracking |
| 0: | gross cracking |

Comparative Example 5

A Comparative Coating Composition (CCoat 5) was prepared by mixing the ingredients with a high-speed disperser. The ingredients of CCoat 5 are presented in Table 9, and the properties of the composition and of a coating layer prepared with this composition are presented in Table 10.

TABLE 9

Ingredients for Comparative Coating Composition 5

| Component | | Parts by weight |
|---|---|---|
| Silyl ester copolymer | CSol 1b | 34.18 |
| Biocides | Copper oxide | 34.18 |
|  | Copper pyrithione | 2.93 |
| Soluble pigment | Zinc oxide | 6.84 |
| Colouring pigment | Iron oxide | 0.98 |
| Extending pigment | Talc | 9.77 |
| Thixotrope | Polyamide wax | 1.50 |
| Solvent | Xylene | 9.62 |

TABLE 10

Properties of Comparative Coating Composition 5

| Properties of composition CCoat 5 | |
|---|---|
| Viscosity (poise) | >40 |
| Nominal solids (theoretical value in % by volume) | 53.8 |
| VOC level (theoretical value in g per litre) | 400 |
| VOC level (determined value in g per litre) | 401 |
| Properties of a coating film of CCoat 5 | |
| König Pendulum hardness (number of swings) | 33 |
| Crack resistance (rating) | 5 |

This Example shows that a high solids paint with a VOC of 400 grams per liter and a viscosity of less than 20 poise cannot be readily prepared from Comparative Copolymer Solution 1b.

Example 6

A Coating Composition according to the present invention (Coat 6) was prepared by mixing the ingredients with a high-speed disperser. The ingredients of Coat 6 are presented in Table 11, and the properties of the composition and of a coating layer prepared with this composition are presented in Table 12.

TABLE 11

Ingredients for Coating Composition 6

| Component | | Parts by weight |
|---|---|---|
| Silyl ester copolymer | Sol 2 | 34.41 |
| Biocides | Copper oxide | 34.41 |
|  | Copper pyrithione | 2.95 |
| Soluble pigment | Zinc oxide | 6.88 |
| Colouring pigment | Iron oxide | 0.98 |
| Extending pigment | Talc | 9.83 |
| Thixotrope | Polyamide wax | 1.51 |
| Solvent | Xylene | 9.00 |

TABLE 12

Properties of Comparative Coating Composition 6

| Properties of composition Coat 6 | |
|---|---|
| Viscosity (poise) | 4.6 |
| Nominal solids (theoretical value in % by volume) | 53.9 |
| VOC level (theoretical value in g per litre) | 398 |
| VOC level (determined value in g per litre) | 398 |
| Properties of a coating film of Coat 6 | |
| König Pendulum hardness (number of swings) | 25 |
| Crack resistance (rating) | 5 |

This Example shows that a high solids paint with a VOC of 400 grams per liter and a viscosity of less than 20 poise can be readily prepared from Copolymer Solution 2.

Example 7

A Coating Composition according to the present invention (Coat 7) was prepared by mixing the ingredients with a high-speed disperser. The ingredients of Coat 7 are presented in Table 13, and the properties of the composition and of a coating layer prepared with this composition are presented in Table 14.

TABLE 13

Ingredients for Coating Composition 7

| Component | | Parts by weight |
|---|---|---|
| Silyl ester copolymer | Sol 5 | 29.30 |
| Co-resins | Methyl methacrylate/n-butyl methacryle copolymer solution[1] | 4.00 |
| | Gum rosin solution[2] | 5.76 |
| Biocides | Copper oxide | 33.07 |
| | Copper pyrithione | 2.83 |
| Soluble pigment | Zinc oxide | 6.61 |
| Colouring pigment | Iron oxide | 0.94 |
| Extending pigment | Talc | 9.45 |
| Thixotropes | Bentonite | 0.96 |
| | Amorphous silica | 0.77 |
| Solvent | Xylene | 6.3 |

[1]Degalan LP64/12 (ex Rohm Chemische Fabrik); 45% by weight solution in xylene
[2]Natural rosin, 65% by weight solution in xylene

TABLE 14

Properties of Comparative Coating Composition 7

| Properties of composition Coat 7 | |
|---|---|
| Viscosity (poise) | 3.7 |
| Nominal solids (theoretical value in % by volume) | 59.7 |
| VOC level (theoretical value in g per litre) | 349 |
| VOC level (determined value in g per litre) | 345 |

TABLE 14-continued

Properties of Comparative Coating Composition 7

| Properties of a coating film of Coat 7 | |
|---|---|
| König Pendulum hardness (number of swings) | 12 |
| Crack resistance (rating) | 5 |

Comparative Example 8

The properties of a commercial silyl ester copolymer antifouling paint, Sea Quantum Plus ex Jotun Paints (CCoat8), were determined for comparison. The properties of CCoat 8 and of a coating layer prepared with this composition are presented in Table 15.

TABLE 15

Properties of Comparative Coating Composition 8

| | CCoat 8 |
|---|---|
| Properties of composition CCoat 8 | |
| Viscosity (poise) | 3.2 |
| Solids[3] (in % by volume) | 47 |
| VOC level (theoretical value in g per litre) | Unknown |
| VOC level (determined value in g per litre) | 452 |
| Properties of a coating film of CCoat 8 | |
| König Pendulum hardness (number of swings) | 15 |
| Crack resistance (rating) | 5 |

[3]As published in Technical Data Sheet, Antifouling Sea Quantum Plus, Jotun Paints, 17 Mar. 2003

This Example shows that the mechanical properties (hardness and crack resistance) of the commercial silyl ester copolymer antifouling paint CCoat 8 are similar to those of Coat 6 and Coat 7.

The invention claimed is:

1. A silyl ester copolymer solution, comprising a silyl ester copolymer having a weight-average molecular weight between 1,500 and 20,000 wherein the silyl ester copolymer solution has a solids content of at least 55 weight percent and a viscosity of less than 20 poise at 25° C.

2. The silyl ester copolymer solution according to claim 1, wherein the solids content of the solution is not more than 80 weight per cent.

3. The silyl ester copolymer solution according to claim 1, wherein the silyl ester copolymer solution comprises a silyl ester copolymer having a weight-average molecular weight of less than 20,000, a polydispersity of less than 3.0, a glass transition temperature below 90° C., with less than 70 weight per cent of said silyl ester copolymer consisting of side chains having a silyl ester functionality.

4. The silyl ester copolymer solution according to claim 1, wherein the silyl ester copolymer is a copolymer comprising at least one side chain bearing at least one terminal group of the formula:

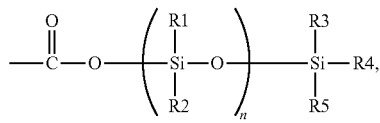

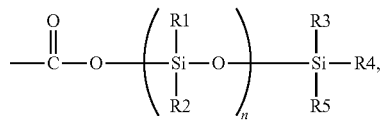

wherein n is 0 or an integer of 1 to 50, and R1, R2, R3, R4, and R5 are each independently selected from the group consisting of optionally substituted $C_{1-20}$-alkyl, optionally substituted $C_{1-20}$-alkoxy, optionally substituted aryl, and optionally substituted aryloxy.

5. The silyl ester copolymer solution according to claim 4, wherein n=0 and R3, R4, and R5 are the same or different, and are methyl, isopropyl, n-butyl, isobutyl, or phenyl.

6. An antifouling coating composition, comprising a silyl ester copolymer and an ingredient having biocidal properties for aquatic organisms, wherein the composition has a VOC below 400 grams per liter and a viscosity of less than 20 poise at 25° C.

7. The antifouling coating composition according to claim 6, wherein the silyl ester copolymer is a silyl ester copolymer having a weight-average molecular weight less of than 20,000, a polydispersity of less than 3.0, a glass transition temperature below 90° C., with less than 70 weight per cent of said silyl ester copolymer consisting of side chains having a silyl ester functionality.

8. The antifouling coating composition according to claim 6, wherein the silyl ester copolymer is a copolymer comprising at least one side chain bearing at least one terminal group of the formula:

wherein n is 0 or an integer of 1 to 50, and R1, R2, R3, R4, and R5 are each independently selected from the group consisting of optionally substituted $C_{1-20}$-alkyl, optionally substituted $C_{1-20}$-alkoxy, optionally substituted aryl, and optionally substituted aryloxy.

9. The antifouling coating composition according to claim 8, wherein n=0, and R3, R4, and R5 are the same or different, and are methyl, isopropyl, n-butyl, isobutyl, or phenyl.

10. The antifouling coating composition according to claim 6, wherein the composition further comprises one or more polymers or resins selected from the group consisting of compounds which are free of triorganosilyl ester groups and triorganotin groups, but are reactive in seawater, and materials which are slightly soluble or water-sensitive in seawater, and materials which are insoluble in seawater.

11. The antifouling coating composition according to claim 10, wherein the composition comprises a rosin material as the material that is slightly soluble or water-sensitive in seawater.

12. A substrate or structure coated with the antifouling coating composition according to claim 6.

* * * * *

(12) EX PARTE REEXAMINATION CERTIFICATE (10448th)
United States Patent
Finnie

(10) Number: US 7,691,938 C1
(45) Certificate Issued: Dec. 19, 2014

(54) SILYL ESTER COPOLYMER COMPOSITIONS

(75) Inventor: Alistair Andrew Finnie, Whitley Bay (GB)

(73) Assignee: Akzo Nobel Coatings International B.V., BM Arnhem (NL)

Reexamination Request:
No. 90/012,593, Sep. 14, 2012

Reexamination Certificate for:
Patent No.: 7,691,938
Issued: Apr. 6, 2010
Appl. No.: 10/563,129
Filed: Jan. 31, 2006

(21) Appl. No.: 90/012,593

(22) PCT Filed: Jun. 29, 2004

(86) PCT No.: PCT/EP2004/007301
§ 371 (c)(1), (2), (4) Date: Jan. 31, 2006

(87) PCT Pub. No.: WO2005/005516
PCT Pub. Date: Jan. 20, 2005

(30) Foreign Application Priority Data
Jul. 7, 2003 (EP) .................................. 03254297

(51) Int. Cl.
*C09D 5/02* (2006.01)

(52) U.S. Cl.
USPC ........................................ 524/556; 424/78.09

(58) Field of Classification Search
None
See application file for complete search history.

(56) References Cited

To view the complete listing of prior art documents cited during the proceeding for Reexamination Control Number 90/012,593, please refer to the USPTO's public Patent Application Information Retrieval (PAIR) system under the Display References tab.

*Primary Examiner* — Alan Diamond

(57) ABSTRACT

The invention relates to a silyl ester copolymer solution having a solids content of at least 55 weight percent and a viscosity of less than 20 poise at 25° C., comprising a silyl ester copolymer having a weight-average molecular weight of less than 20,000. The invention further relates to coating compositions comprising a silyl ester copolymer and to substrates and structures having a cured coating prepared from such a coating composition.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-12 are cancelled.

\* \* \* \* \*